(12) United States Patent
Flanery

(10) Patent No.: US 9,080,704 B2
(45) Date of Patent: Jul. 14, 2015

(54) UNIVERSAL PIPE COUPLER

(76) Inventor: Shaun M. Flanery, Ottawa, IL (US)

( * ) Notice: Subject to any disclaimer, the term of this patent is extended or adjusted under 35 U.S.C. 154(b) by 679 days.

(21) Appl. No.: 13/278,123

(22) Filed: Oct. 20, 2011

(65) Prior Publication Data

US 2013/0026753 A1 Jan. 31, 2013

Related U.S. Application Data

(60) Provisional application No. 61/513,400, filed on Jul. 29, 2011.

(51) Int. Cl.
*F16L 21/06* (2006.01)
*F16L 25/14* (2006.01)

(52) U.S. Cl.
CPC .................................. *F16L 25/14* (2013.01)

(58) Field of Classification Search
USPC ............................................. 285/322, 12, 45
See application file for complete search history.

(56) References Cited

U.S. PATENT DOCUMENTS

| | | | | |
|---|---|---|---|---|
| 720,538 | A * | 2/1903 | Wallace | 285/322 |
| 865,498 | A * | 9/1907 | Kenyon | 285/322 |
| 1,586,706 | A * | 6/1926 | Russell | 285/12 |
| 2,159,150 | A | 5/1939 | Heintz | |
| 2,449,756 | A * | 9/1948 | Trautmann | 285/322 |
| 2,556,659 | A * | 6/1951 | Patterson | 285/322 |
| 2,667,117 | A | 1/1954 | Millard et al. | |
| 2,857,177 | A | 10/1958 | Loetz | |
| 3,113,790 | A * | 12/1963 | Matthiessen | 285/45 |
| 3,204,988 | A | 9/1965 | Ouderkirk et al. | |
| 3,424,403 | A | 1/1969 | Hull | |
| 3,527,479 | A * | 9/1970 | Matthiessen | 285/45 |
| 3,628,814 | A * | 12/1971 | Hallwood | 285/45 |
| 3,775,810 | A | 12/1973 | Smith, Jr. et al. | |
| 4,000,919 | A | 1/1977 | Edwards et al. | |
| 4,120,519 | A * | 10/1978 | Bridges | 285/322 |
| 4,216,980 | A * | 8/1980 | Shreve | 285/45 |
| 4,229,025 | A | 10/1980 | Volgstadt et al. | |
| 4,674,262 | A * | 6/1987 | Goerlitz | 285/322 |
| 4,790,571 | A | 12/1988 | Mtanari et al. | |
| 4,953,452 | A | 9/1990 | Tarlow | |
| 5,160,179 | A | 11/1992 | Takagi | |
| 5,823,266 | A | 10/1998 | Burleson et al. | |
| 6,343,770 | B2 | 2/2002 | Holemans | |
| 7,690,691 | B2 | 4/2010 | Kurdziel | |
| 7,699,357 | B2 | 4/2010 | Msen et al. | |
| 7,726,703 | B2 | 6/2010 | Porter et al. | |
| 7,832,773 | B2 | 11/2010 | Krohn | |
| 2005/0248098 | A1 | 11/2005 | Sisk et al. | |
| 2013/0026753 | A1* | 1/2013 | Flanery | 285/322 |

* cited by examiner

*Primary Examiner* — David E Bochna
(74) *Attorney, Agent, or Firm* — Kinne IP Group, P.C.; Charles C. Kinne; Mary E. Adams

(57) ABSTRACT

A universal pipe coupler is disclosed. The coupler has a support ring with an outer surface, a plurality of blades arranged into a blade array surrounding the support ring, each blade having a proximal end and a distal end, and a flexible restraining member moveable between an elongated position and a shortened position. Each blade proximal end is pivotally attached to the outer surface of the support ring. Each blade distal end extends radially away from the ring and is moveable between an open position and a closed position. The restraining member is positioned to slidably engage each blade, whereby when the restraining member is in the elongated position, the blades are movable to the open position and when the restraining member is in the shortened position the blades are drawn to the closed position.

8 Claims, 10 Drawing Sheets

UNIVERSAL PIPE COUPLER

CROSS REFERENCE TO RELATED APPLICATIONS

This application claims priority to U.S. provisional patent application Ser. No. 61/513,400, filed Jul. 29, 2011.

FIELD OF THE INVENTION

A universal pipe coupler is disclosed. In a preferred embodiment, the pipe coupler is constructed and arranged to permit joinder of two pipes while at the same time permitting use in a small space, thereby eliminating substantial excavation work.

In a more preferred embodiment, the pipe coupler is constructed and arranged to be used with a first pipe of a specified diameter and with a second size of an unspecified diameter, such that the coupler is adaptable to a variety of diameters of the second pipe.

In an even more preferred embodiment, the pipe coupler is constructed and arranged to be used with a first pipe of a specified diameter and with a second size of an unspecified diameter, the coupler begin threadably joined to the first pipe and being flexibly joined to the second pipe, such that the coupler is adaptable to a variety of diameters of the second pipe.

In a most preferred embodiment, the pipe coupler is constructed and arranged to be used with a first pipe of an unspecified diameter and with a second pipe of an unspecified diameter, the coupler being flexibly joined to the first pipe and being flexibly joined to the second pipe, such that the coupler is adaptable to a variety of diameters of both the first and second pipe.

BACKGROUND OF THE INVENTION

There is need for a universal pipe coupler that can provide a combination of features facilitating convenient installation in the field with maximum adaptability to a plurality of pipe diameters.

The following patents and published applications illustrate the efforts of others to address the problems identified and solved by the disclosure herein. As can be seen, there are a vast array of efforts already existing to provide a solution to the problems confronted when seeking to achieve convenient installation in the field with maximum adaptability to a plurality of pipe diameters, but none provides the combination of features and advantages presented in the instant disclosure.

These references include U.S. Pat. No. 7,832,773 entitled "Adjustable Connector and Method for Its Use," issued to Krohn on Nov. 16, 2010; U.S. Pat. No. 7,726,703 entitled "Deformable Pipe Coupling Having Multiple Radii of Curvature," issued to Porter et al. on Jun. 1, 2010; U.S. Pat. No. 7,699,357 entitled "Coupling for Tubes," issued to Monsen et al. on Apr. 20, 2010; U.S. Pat. No. 7,690,691 entitled "Coupler for Joining Plastic and Concrete Pipe," issued to Kurdziel on Apr. 6, 2010; U.S. Pat. No. 6,343,770 entitled "Reusable, Separable, Structural Connector Assembly," issued to Holemans on Feb. 5, 2002; U.S. Pat. No. 5,823,266 entitled "Latch and Release Tool Connector and Method," issued to Burleson et al. on Oct. 20, 1998; U.S. Pat. No. 5,160,179 entitled "Pipe Coupler with Split Ring. Chuck," issued to Takagi on Nov. 3, 1992; U.S. Pat. No. 4,953,452 entitled "Collapsible Steamer Basket," issued to Tarlow on Sep. 4, 1990; U.S. Pat. No. 4,790,571 entitled "Quick-Coupling Connector Group for Pipes, Piles or the Like," issued to Montanari et al. on Dec. 13, 1998; U.S. Pat. No. 4,229,025 entitled "Stab-Type Coupling," issued to Volgstadt et al. on Oct. 21, 1980; U.S. Pat. No. 4,000,919 entitled "Pipe Coupler," issued to Edwards et al. on Jan. 4, 1977; U.S. Pat. No. 3,775,810 entitled "Expandable Collar," issued to Smith, Jr. et al. on Dec. 4, 1973; U.S. Pat. No. 3,424,403 entitled "Mass Release Mechanism for Satellites," issued to Hull on Jan. 28, 1969; U.S. Pat. No. 3,204,988 entitled "Stab Type Pipe Coupling with Gasket Back Up Ring," issued to Ouderkirk et al. on Sep. 7, 1965; U.S. Pat. No. 2,857,177 entitled "Plural Ball and Socket Flexible Sealed Coupling for High Temperature Gas Conduits," issued to Loetz on Oct. 21, 1958; U.S. Pat. No. 2,667,117 entitled "Adjustable Colander for Cooking and Serving Vegetables and the Like," issued to Millard et al. on Jan. 26, 1954; U.S. Pat. No. 2,159,150 entitled "Ignition Mechanism," issued to Heintz on May 23, 1939; U.S. Pat. No. 865,498 entitled "Implement for Coupling Pipe," issued to Kenyon on Sep. 10, 1907; U.S. Patent Application Publication No. US2005/0248098 entitled "Gasket for a Coupler Upon a Rail Car, Tank Trailer, or Related Means," in the name of Sisk et al., published on Nov. 10, 2005.

More specifically, U.S. Pat. No. 7,832,773 generally discloses an adjustable connector that acts as a coupling device to connect an object, such as pipe or tubing, having a range of diameters and thread styles to an item, such as a piece of equipment or another length of pipe or tubing. The device includes a casing member and an internal member, which further has tab members positioned in tab openings in a core member. Preferably, a semi-flexible sheath covers the internal member and seals it to the casing member and the object, so that a chamber is formed between the internal member and the casing member. Mechanical compression members may be placed in the chamber. As pressure increases within the object, the chamber pressure may also increase, forcing the sheath against the tab members, which are forced against the object, holding the object in place by friction.

U.S. Pat. No. 7,726,703 generally discloses a pipe coupling for joining pipe elements end-to-end is disclosed. The pipe coupling is formed of segments attached to one another circumferentially straddling the pipe elements. The segments are formed from sub-sections connected to one another end-to-end. Each sub-section has a surface region disposed to engage the outer surfaces of the pipe elements. Each surface region has a different radius of curvature from a surface region on a neighboring sub-section. The radii are selected so that when the coupling segments are deformed around the pipe elements, portions of surface regions of selected sub-sections contact the pipe elements, while portions of surface regions of those sub-sections between the selected portions remain in spaced relation away from the pipe elements. A constant and minimal torque is required to bolt the segments together as a result.

U.S. Pat. No. 7,699,357 generally discloses a coupling having a coupling housing and a coupling member. The coupling housing has a first housing part and a second housing part capable of being screwed together axially. Each of the first housing part and the second housing part has an internal conical surface, wherein, in a position that the first housing part and the second housing part are screwed together, the inner circumference of each of the internal conical surfaces generally lessen towards outward ends thereof, respectively. The coupling member is situated in the housing for clamping a tube inserted in the coupling housing. The coupling member is influenced axially by a conical clamping ring by cooperation with the conical surface in the first housing part and influences a resilient ring which causes sealing between the tube and the second housing part. One end of the coupling member is shaped as axial, flexible fingers separated by splits. As the first housing part and the second housing part are screwed together, the free ends of the fingers contact the resilient ring and are forced along the conical surface in the second housing part so as to force the resilient ring along the conical surface of the second housing part, whereby the resilient ring is compressed against the tube (FIGS. 3, 4, Elements 18, 20, 8, 9; Claim 1; Column 3, Lines 33-61).

U.S. Pat. No. 7,690,691 generally discloses a plastic pipe coupler having a plurality of sections connected to one another, with at least one gap between the ends of two adjacent sections. Each of the coupler sections has an exterior surface and an interior surface, and is fabricated so that when taken together, the sections cooperatively circumvent a section of plastic pipe. Each bracket is secured to the exterior surface of one of the aforesaid sections of the coupler and has a base plate, a pair of sidewall plates attached to each base plate, and a crosspiece having a first end and a second end, the first end of which is in contacting relationship with one of the pair of sidewall plates, while the second end is in contacting relationship with the other of the pair of sidewall plates.

U.S. Pat. No. 6,343,770 generally discloses a separation connector having a first component, having a plurality of leaf elements with protrusions, and a second component, having a recess for receiving the leaf element protrusions. The protrusions of the leaf elements are secured within the recess by a tensioned band, or in an alternative embodiment, by an expansion band; the protrusions and recess are formed so as to provide an efficient and effective load and torque bearing surface that requires minimal tension on the tensioned band, or minimal compression on the expansion band. A shearing structure is also presented that minimizes translation of the leaf elements with respect to the receiving surface. When the band is released, springs or other means urge the leaves away from the mating surface, thereby allowing for the separation of the connected items. Preferably, the leaves are hinged, allowing for ease of coupling and decoupling to the mating surface. Multiple sections of leaf elements can be employed to form a perimeter structure corresponding to the structure of the mating surface (FIG. 8a, Element 210; Claims 1, 15, 22, 29, 30; Column 4, Lines 10-23).

U.S. Pat. No. 5,823,266 generally discloses a tool connector for downhole use in oil and gas fields. The tool connector includes a stinger and a stinger receptacle. The stinger is adapted to be stabbed into the stinger receptacle. A loaded engaging member movable between a running position before the stinger is stabbed into the stinger receptacle and a latched position when the stinger is stabbed into the stinger receptacle to latch the stinger and the stinger receptacle together. A release member retains the loaded engaging member in the running position. When the stinger is stabbed into the stinger receptacle and a set force is applied to the stinger and stinger receptacle, the release member releases the loaded engaging member to move to the latched position and latch the stinger and the stinger receptacle together. According to a second aspect of the invention, the tool connector is releasable, further including a releasable stop member to stop the engaging member in the latched position. When the stop member is released, the engaging member moves to a released position such that the stinger and stinger receptacle are separable. According to a third aspect of the invention having particular application to perforating gun sections, a tool connector is provided with an internal explosive transfer system for transferring the detonation signal from one perforating gun, through the perforating gun connector, and to the next perforating gun. In addition, a method of connecting a first tool section to a second tool section is provided.

U.S. Pat. No. 5,160,179 generally discloses a pipe coupler in which a sealing ring, an annular chuck and a release ring are inserted into a mounting recess of a coupler main body. Annular reaction surfaces are provided at the tip side of the annular chuck, and an action surface for contracting the diameter is provided at the internal periphery of the mounting recess. Claws are formed at the tip of the annular chuck, and a slit is provided in the annular chuck for permitting enlargement and contraction of the chucks diameter. When a flexible tube is inserted into the mounting recess, the diameter of the annular chuck is enlarged. In this condition, when a compressed fluid is supplied, the claws bite the flexible tube. As the release ring is pressed into the mounting recess, the engagement of the claws with the flexible tube is released. The reference thus discloses a split ring coupler for different sized pipes, which comprises a plurality of tabs extending outward from the ring (FIGS. 6, 7, Elements 801, 8, 802, 901, 902, 9; Claim 1; Column 6, Lines 49-68).

U.S. Pat. No. 4,953,452 generally discloses a collapsible steamer basket for insertion into the interior of a vessel such as a cook pot. Vegetables or the like can be placed inside the basket and steamed. The basket has a plurality of foldable leaves provided with holes; the leaves overlap and conform to the interior of the vessel. A built-in signal device is provided for audibly signaling when the interior of the vessel reaches a predetermined temperature to avoid burning of the foods being steamed (FIG. 1, Elements 11, 12, 22, 19; Claims 1, 4, 6, 7, 15; Column 2, Lines 4-68). This reference is not analogous art and does not generally relate to the scope of the present disclosure.

U.S. Pat. No. 4,790,571 generally discloses a quick-coupling connector assembly for pipes, piles or the like. The connector has a pair of half-couplers, male and female, capable of being connected to the ends of the pipe to be joined. The male half-coupler has, on its external surface, an annular raised profile capable of being coupled with a corresponding annular raised profile present on the internal surface of the female half-coupler proximal to its end. The female half-coupler is equipped with axial slits defining along its entire surface a plurality of outwardly elastically flexible lamellar elements, adapted to permit the fitting of the female half-coupler over the male half-coupler and the coupling together of the respective raised annular profiles. An axially movable ring is also provided, capable of being fitted over the female half-coupler and of being blocked in position for preventing radial deformations at the end of zone of the female half-coupler itself.

U.S. Pat. No. 4,229,025 generally discloses a stab-type coupling and method for connecting an end portion of a smooth wall non-metallic pipe to fittings or other pipes. The coupling is defined by a non-metallic coupling body, a generally elongated hollow insert, annular spacer rings, seal rings, a collet drib, and a retaining collet all disposed within the recess of the coupling body. The retaining collet is provided with a tapered external surface which is complementary to an internal frustroconical surface defined by a back-up ring molded within the coupling body. The coupling is made up as by inserting the end of a smooth wall non-metallic pipe into the coupling body such that the pipe is received about the generally elongated hollow insert and within the retaining collet. The toothed internal surface of the retaining collet is adapted to engage the non-metallic pipe. Attempted withdrawal of the pipe from the coupling body is resisted by the collet toothed surface as well as the bearing engagement of the collet with the back-up ring molded into the coupling body. The reference thus discloses a ring collar with fingers or rings extending therefrom, which comprises a metal ring flexible enough to be fit inside an adjoining pipe (FIG. 3, Elements 68, 78, 72, 70; Claim 1).

U.S. Pat. No. 4,000,919 generally discloses a coupler for effecting hermetically sealed pipe or conduit interconnection by slip fit and without the use of tools. A coupler body member and a screw-on nut compress therebetween the outer marginal frusto-conical portion of a spring metal locking ring having arcuate segments directed angularly inwardly of the slipfit opening and defining a circle of slightly greater diameter than that of the pipe to be connected before the locking-ring is compressed in place, and slightly lesser in diameter than that of the pipe to be connected when the locking-ring is compressed in place. Pipe disconnect is accomplished by unscrewing the nut, which permits the locking ring to again assume a configuration wherein the arcuate segments define an opening of sufficiently greater diameter to permit withdrawal of the pipe.

U.S. Pat. No. 3,775,810 generally discloses a securing collar for use in securing the four corners of a sheet of tobacco to produce a bundle comprising an annular frustroconical shaped body with corrugated walls which surrounds the four corners of the "sheet" and a severing tab to permit easy removal of the collar (FIG. 1, 2, 3, 7; Claim 1).

U.S. Pat. No. 3,424,403 generally discloses a plurality of leaves positioned around the circumference of a connector, which comprises a joint that can expand or contract according to the size of the pipe to be jointed (FIG. 2, Elements 62, 54, 60, 56; Claim 1; Column 2, Lines 60-72).

U.S. Pat. No. 3,204,988 generally discloses a stab pipe coupling with a gasket back up ring. The rings are provided with outer and inner indentations, or cutouts, so as to be bendable and to conform to the contours of the pipe (FIGS. 2, 3 and 4).

U.S. Pat. No. 2,857,177 generally discloses a metal ring with leaves extending outward from the ring, which comprises a coupling for joining one pipe to a second pipe (FIG. 4, Elements 9, 11, 12, 10; Claim 1).

U.S. Pat. No. 2,667,117 generally discloses a collapsible and adjustable colander, which includes a plurality of tabs disposed around the perimeter of a metal circle and which adjust to fit the size of a receiving pot (FIGS. 1-3, Elements 12, 13, 38; Claims 1-6; Column 3, Lines 3-71). This reference is not analogous art and does not generally relate to the scope of the present disclosure.

U.S. Pat. No. 2,159,150 generally discloses a connector for a pipe joint or coupling, which comprises a plurality of leaves positioned around a circle and which expanded radially to enable the connector to connect to different sized pipes (FIG. 2, 3/27, 28, 39; claim 1-19; col. 2/40-53).

U.S. Pat. No. 865,498 generally discloses a coupling for joining one pipe to another, which comprises leafs or strips 7a and 7b positioned for insertion of the other section of pipe 6 and which leafs or strips 7a and 7b bears thereon the spring 8 (FIGS. 3, 4, 5, 6, Elements 3, 7a, 7b; Claim 1-20; Column 2, Lines 58-91).

U.S. Patent Application Publication No. 2005/0248098 generally discloses a pipe coupler that interconnects pipes and fittings and sections of is pipe end to end for transferring bulk dry and fluid materials. The coupler connects various pipe ends, grooved, smooth, and ground, together. The coupler also connects various fittings such as tees and valves to pipe ends. Two arms clamp upon the two pieces of a gasket to seal the connection of pipes and fittings within the coupler. Ridges on both surfaces of the piece grasp and seal the end of a pipe. The gasket removes any gaps in the connection that would have trapped material and contaminated later loads of material.

Thus, a problem associated with devices that precede the present disclosure is that they do not provide, in combination with the other features and advantages disclosed herein, a universal pipe coupler having adaptability in a small space, such that a minimum of excavation is required to use it.

Yet another problem associated with devices that precede the present disclosure is that they do not provide, in combination with the other features and advantages disclosed herein, a universal pipe coupler that can be specified for use with a multiplicity of pipe diameters for one of the two pipes to be joined.

Still a further problem associated with devices that precede the present disclosure is that they do not provide, in combination with the other features and advantages disclosed herein, a universal pipe coupler that can be specified for use with a multiplicity of pipe diameters for both of the two pipes to be joined.

An additional problem associated with devices that precede the present disclosure is that they do not provide, in combination with the other features and advantages disclosed herein, a universal pipe coupler a sealably secured fitment to a first pipe of specified diameter and also a sealably secured fitment to a second pipe of unspecified diameter.

An even further problem associated with devices that precede the present disclosure is that they do not provide, in combination with the other features and advantages disclosed herein, a universal pipe coupler that is easily transported to the location in the field at which it will be used.

There is a demand, therefore, to overcome the foregoing problems while at the same time providing a universal pipe coupler that is adaptable to a multiplicity of uses and that is also relatively low in cost to manufacture and yet possesses extended durability.

SUMMARY OF THE INVENTION

In a preferred embodiment, a universal pipe coupler is disclosed. The coupler has a central support ring with an outer surface, a plurality of blades arranged into a blade array surrounding the central support ring, each blade having a proximal end and a distal end, and a flexible restraining member moveable between an elongated position and a shortened position. Each blade proximal end is pivotally attached to the outer surface of the central support ring. Each blade distal end extends radially away from the ring and is moveable between an open position and a closed position. The restraining member is positioned to slidably engage each blade, whereby when the restraining member is in the elongated position, the blades are movable to the open position and when the restraining member is in the shortened position the blades are drawn to the closed position. A blade lateral support ring is threadably engaged to the central support ring, the blade lateral support ring having blade lateral support tabs extending radially from the blade lateral support ring, the blade lateral support tabs extend out from the central support ring below and between the pivotally supported blades.

Thus, it is an object of the present disclosure to provide, in combination with the other features and advantages disclosed herein, a universal pipe coupler having adaptability in a small space, such that a minimum of excavation is required to use it.

Still a further object of the present disclosure is to provide, in combination with the other features and advantages disclosed herein, a universal pipe coupler that can be specified for use with a multiplicity of pipe diameters for one of the two pipes to be joined.

An additional object of the present disclosure is to provide, in combination with the other features and advantages disclosed herein, a universal pipe coupler that can be specified for use with a multiplicity of pipe diameters for both of the two pipes to be joined.

Another object of the present disclosure is to provide, in combination with the other features and advantages disclosed herein, a universal pipe coupler that can be sealably secured to a first pipe of specified diameter and also sealably secured to a second pipe of unspecified diameter.

An even further object of the present disclosure is to provide, in combination with the other features and advantages disclosed herein, a universal pipe coupler that can be easily transported to the location in the field at which it will be used.

The following disclosure provides a universal pipe coupler having adaptability to a multiplicity of uses while at the same time is relatively low in cost to manufacture and possesses extended durability.

BRIEF DESCRIPTION OF THE DRAWINGS

In the detailed description that follows, reference will be made to the following figures.

DETAILED DESCRIPTION OF PREFERRED EMBODIMENTS

Figure 1:
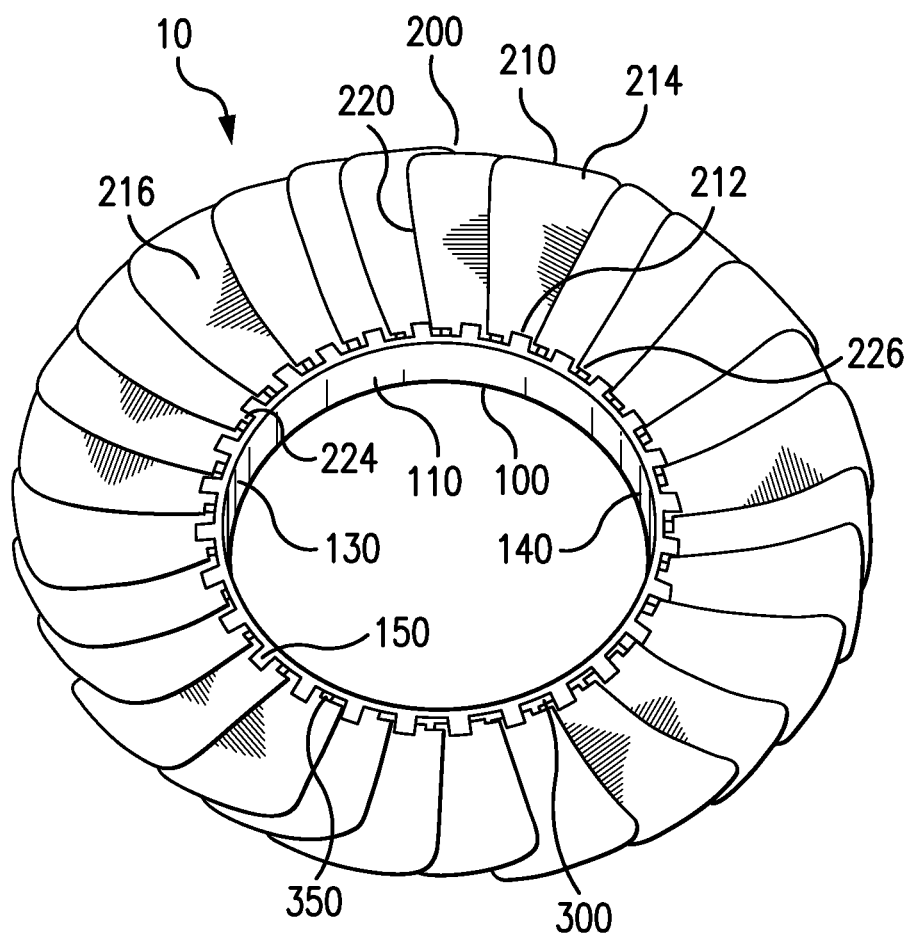
FIG. 1 is a perspective view of a portion of a preferred embodiment.
Figure 5:
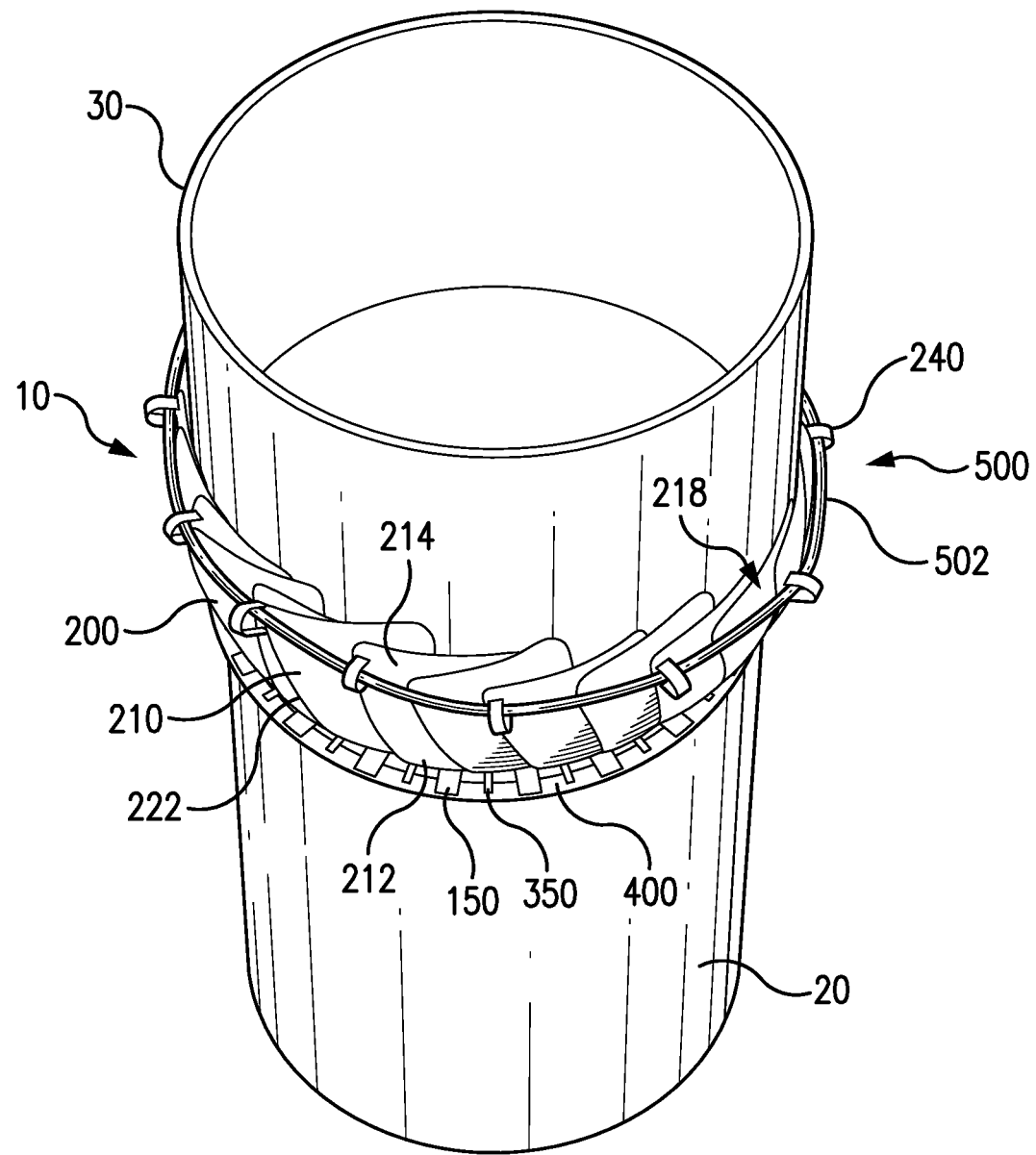
FIG. 5 is still another perspective view of a portion of the preferred embodiment partially illustrated in FIG. 1.
Figure 6:
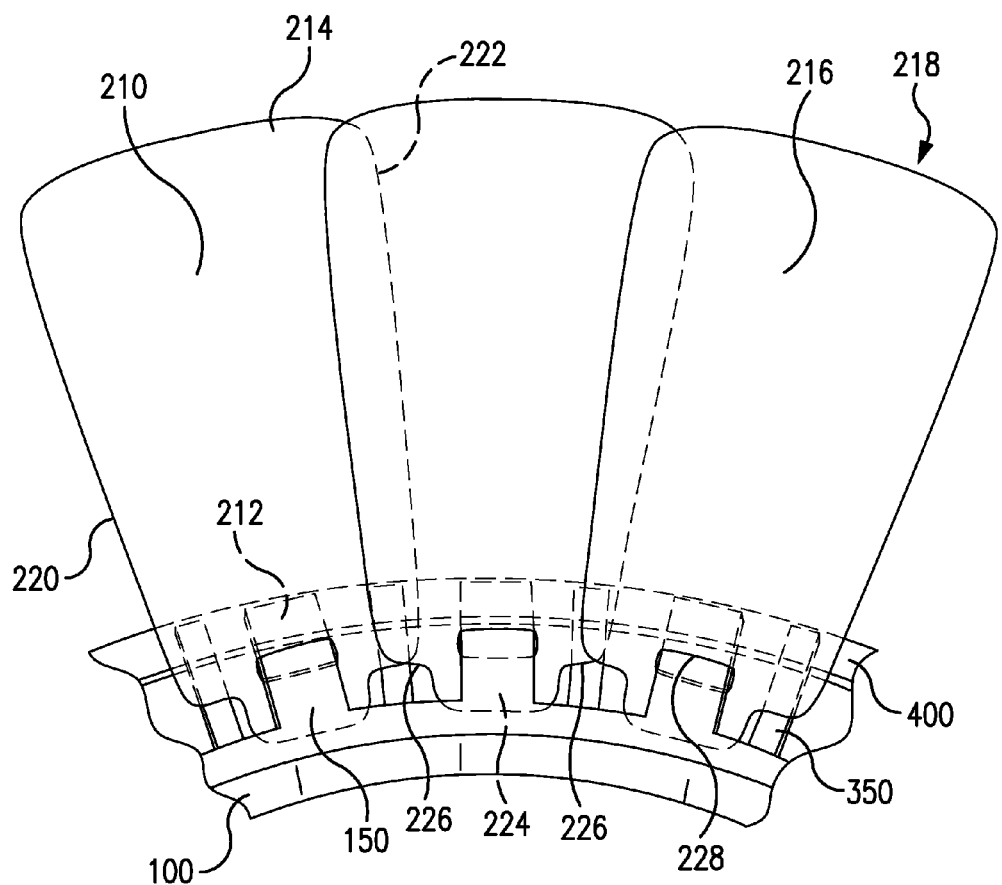
FIG. 6 is a cutaway view of a portion of the preferred embodiment partially illustrated in FIG. 1.
Figure 7:
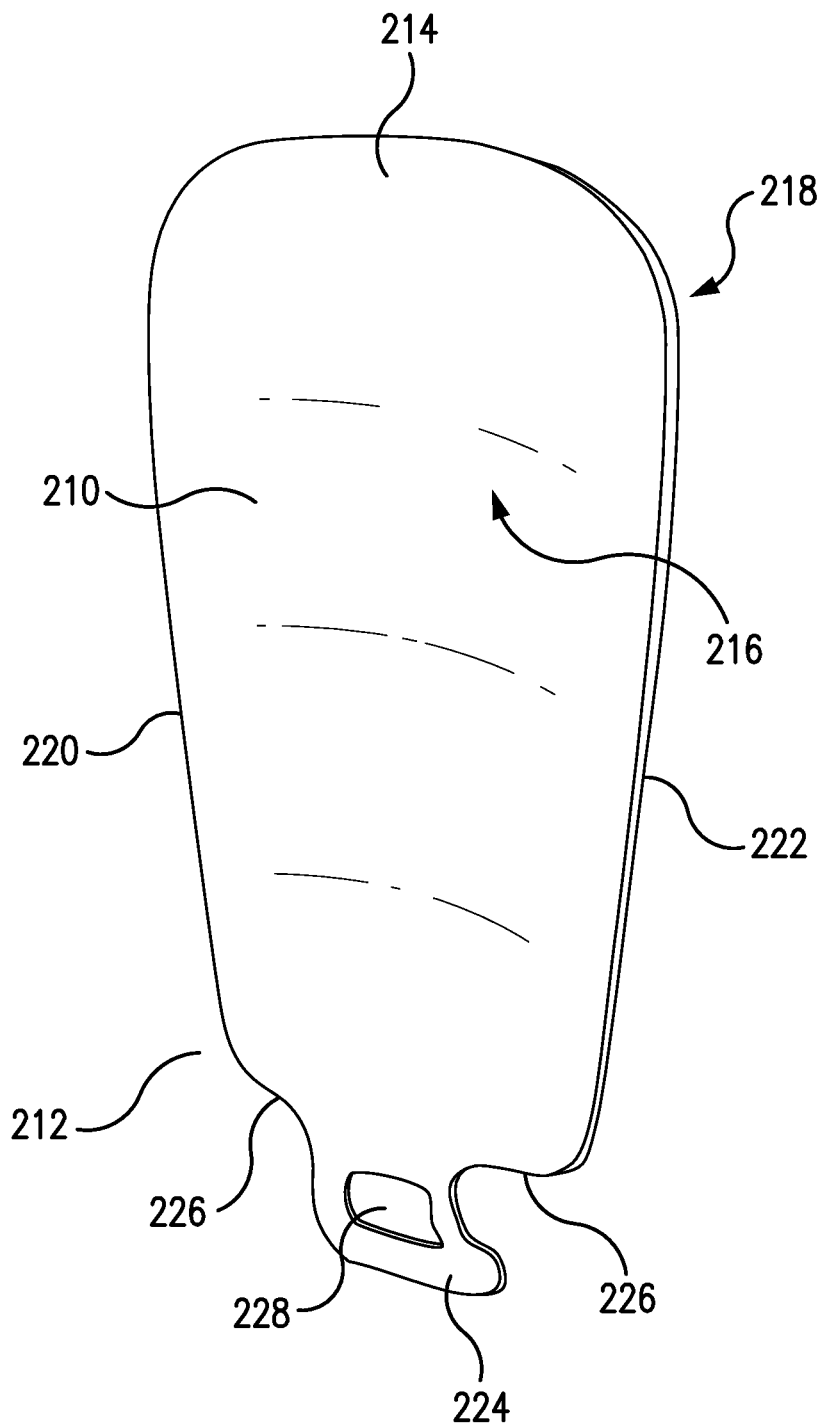
FIG. 7 is a perspective view of a portion of the preferred embodiment partially illustrated in FIG. 1.
Figure 8:
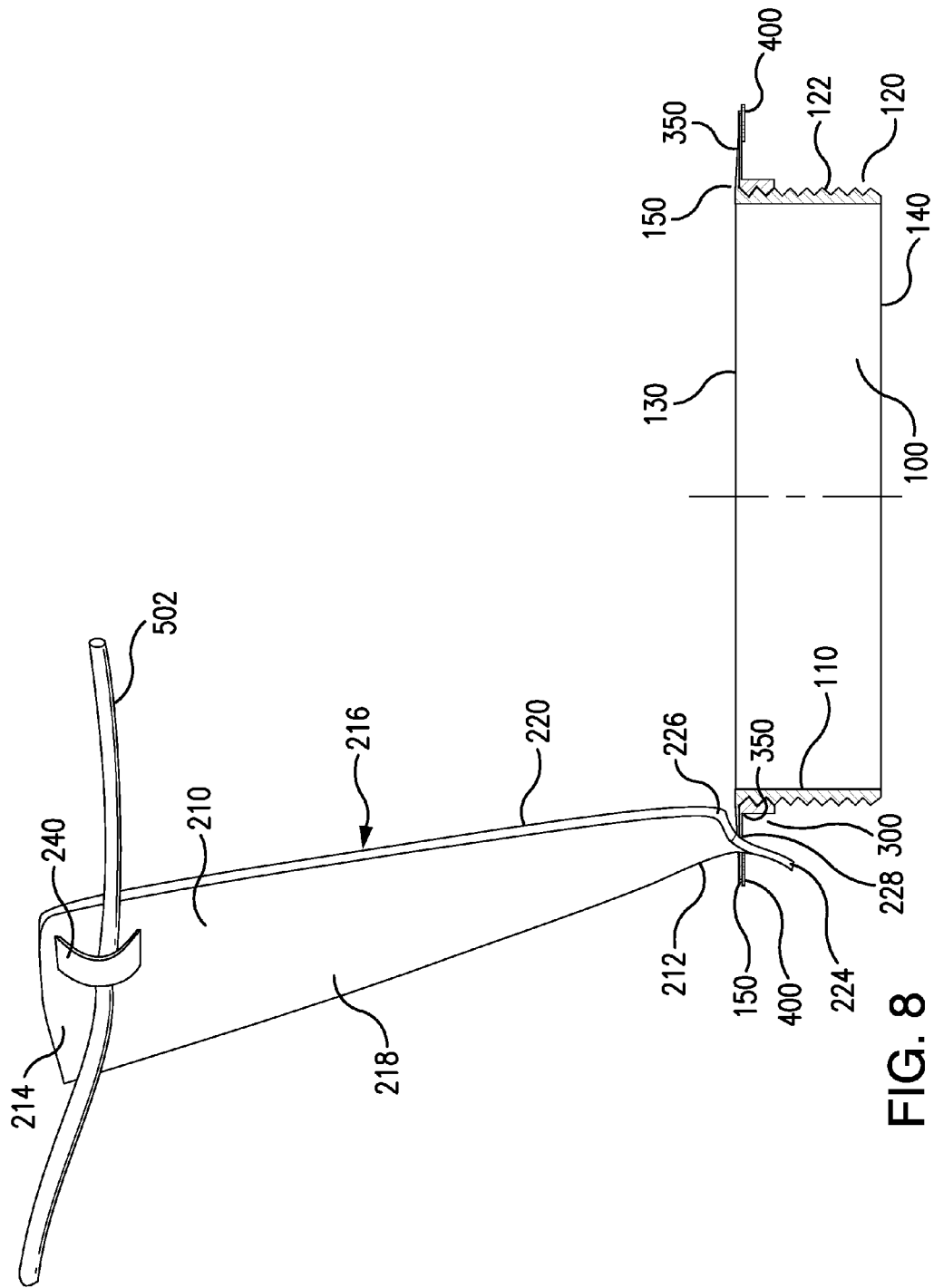
FIG. 8 is a cross-sectional view of a portion of the preferred embodiment partially illustrated in FIG. 1.
Figure 9:
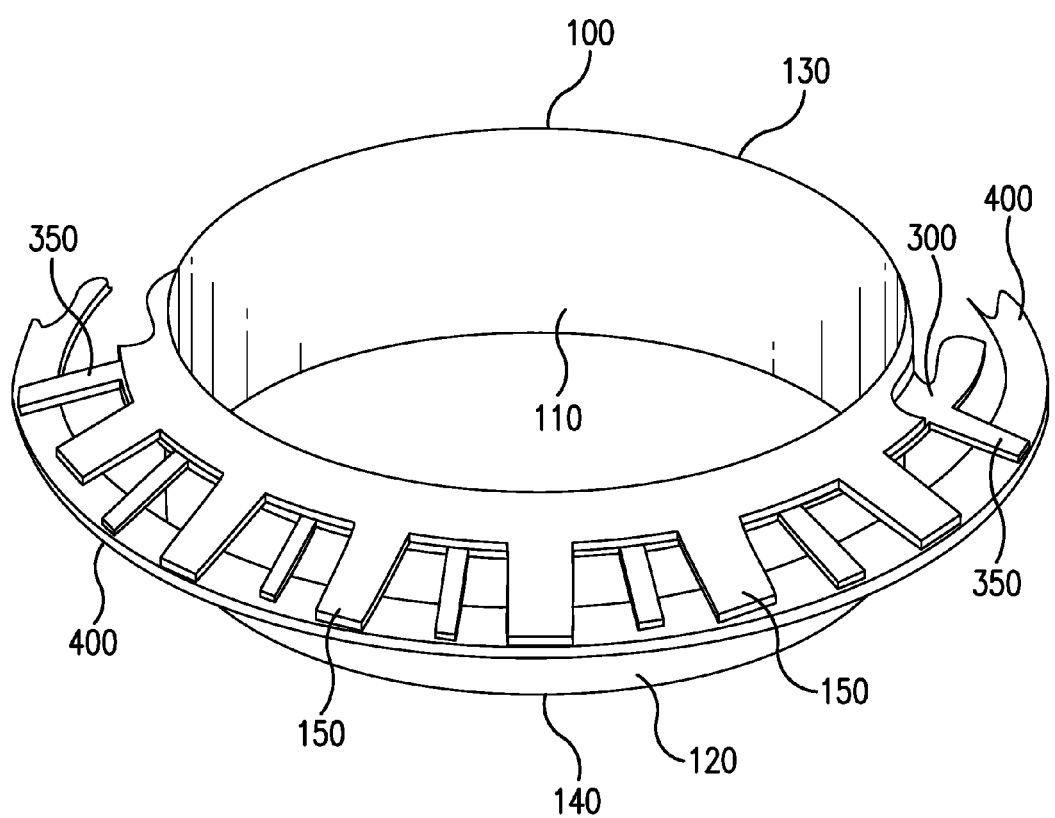
FIG. 9 is a perspective, cut-away view of the preferred embodiment partially illustrated in FIG. 1.
Figure 10:
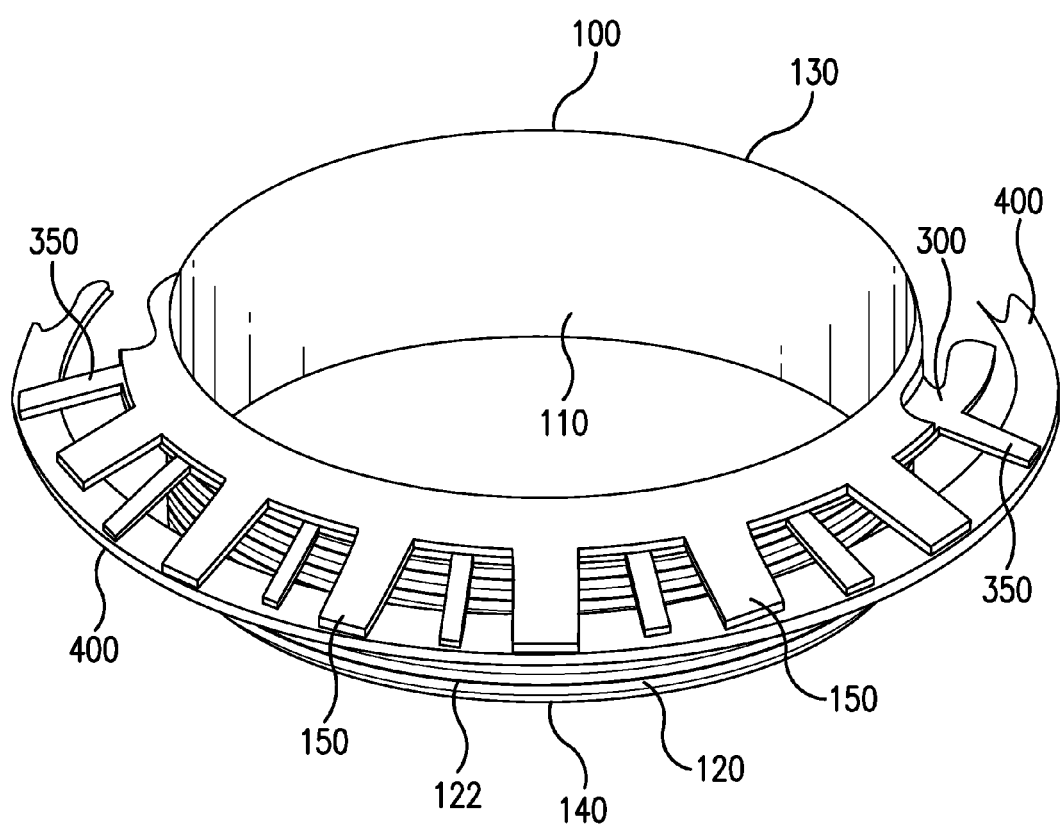
FIG. 10 is a perspective, cut-away view of the preferred embodiment partially illustrated in FIG. 1.

Referring generally to FIGS. 1 and 5, a first preferred embodiment of a universal pipe coupler 10 is shown. The universal pipe coupler 10 is constructed and arranged to be used to connect a first pipe 20 and a second pipe 30 (shown in FIG. 5). The pipes 20, 30 can be of different sizes and, as shown, the universal pipe coupler 10 can provide a substantially air-tight and liquid-tight connection between the pipes 20, 30, especially when used with an epoxy coating on the inside and outside of the blade array 200.

Figure 2:
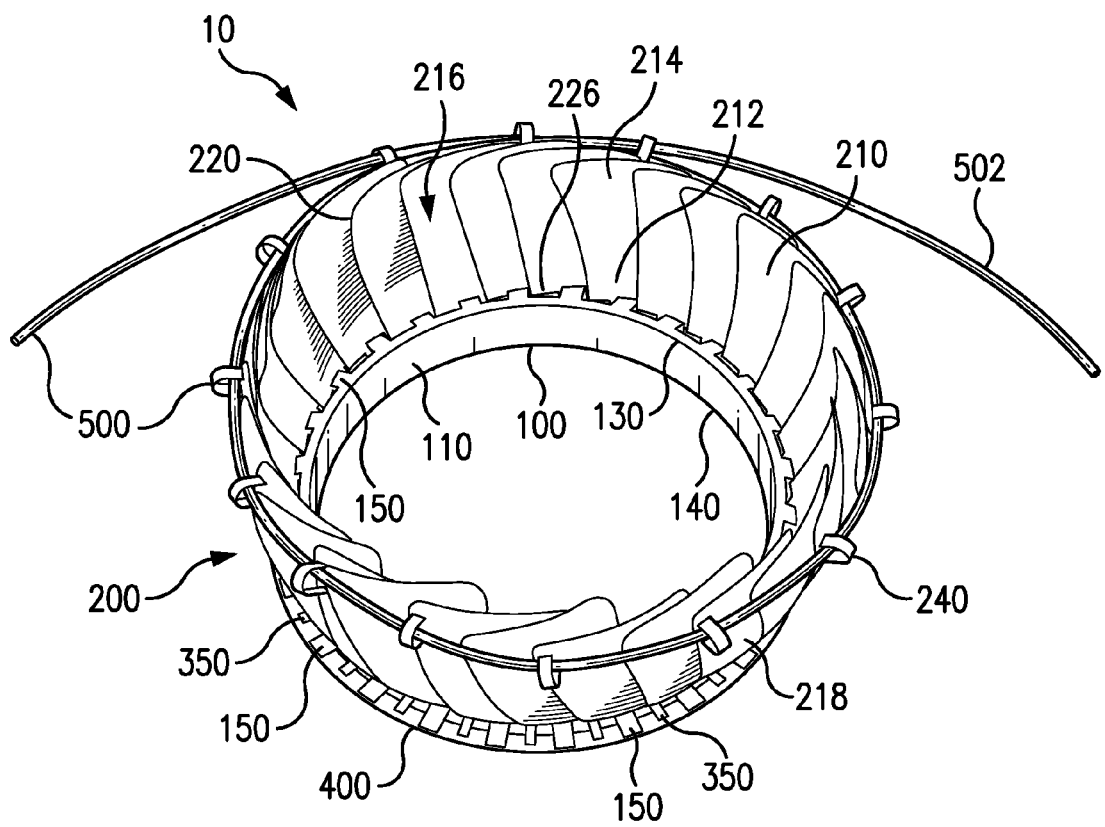
FIG. 2 is a top plan perspective view of a portion of the preferred embodiment partially illustrated in FIG. 1.

Referring generally to FIGS. 1 and 2, the coupler 10 as shown includes at one end a variable-diameter securement assembly, which can accommodate pipes of varying diameters, and at the other end, a fixed-diameter securement assembly, which accommodates only one diameter of pipe. While illustrated in this fashion, it is understood that the coupler 10 could include two variable diameter securement assemblies as an alternative to the embodiment shown herein.

Figure 4:
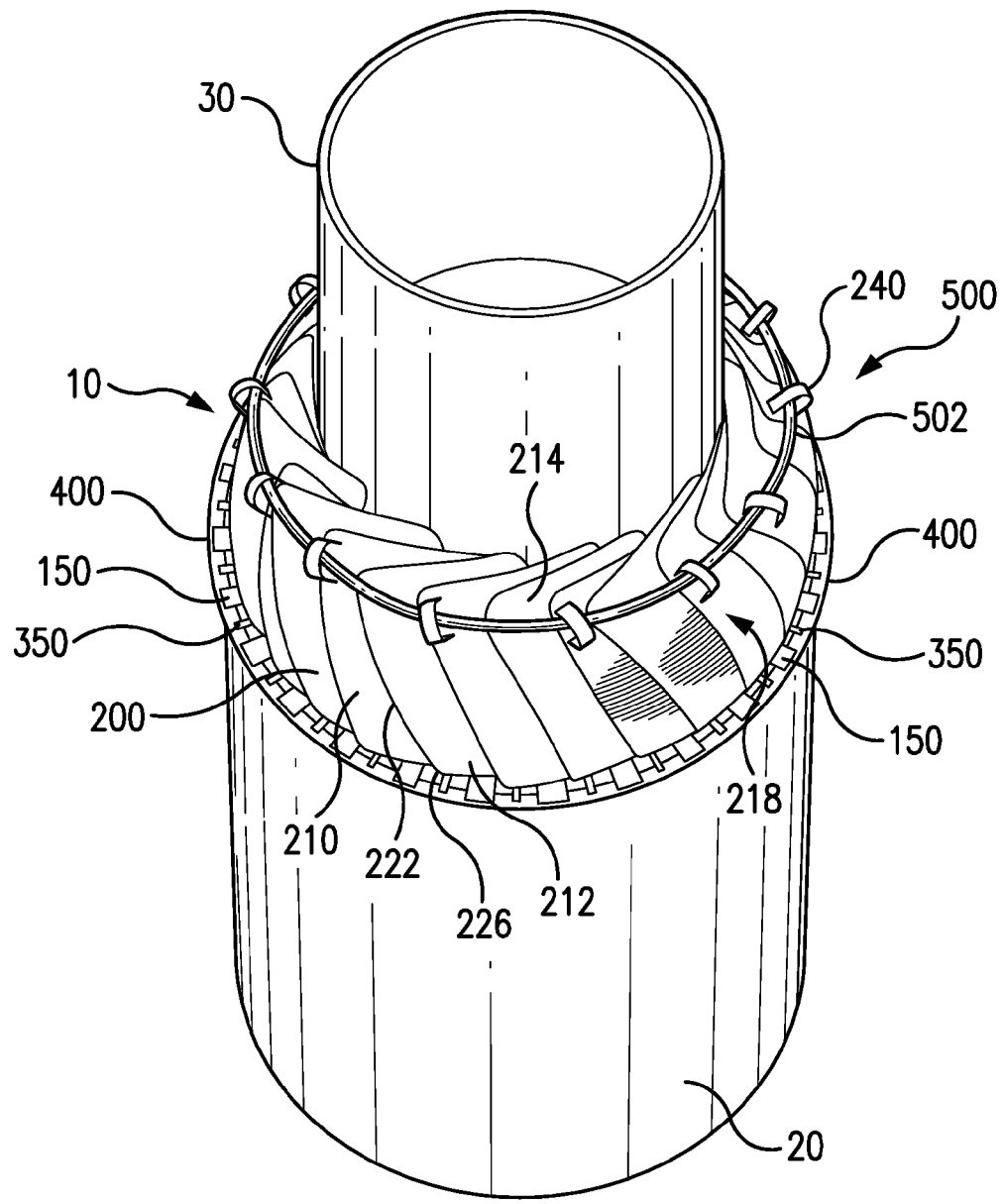
FIG. 4 is another perspective view of a portion of the preferred embodiment partially illustrated in FIG. 1.

Thus, the variable-diameter securement assembly is movable from a first, open position (FIG. 1) to a second, closed position (FIG. 2). FIG. 4 shows a coupler 10 having a fixed-diameter securement assembly secured to a first pipe 20 having a relatively large diameter and a variable-diameter secure- ment assembly secured to a second pipe 30 having a relatively small diameter. Conversely, FIG. 5 shows a coupler 10 having a fixed-diameter securement assembly secured to a first pipe 20 having a relatively small diameter and a variable-diameter securement assembly secured to a second pipe 30 having a relatively large diameter.

Figure 3:
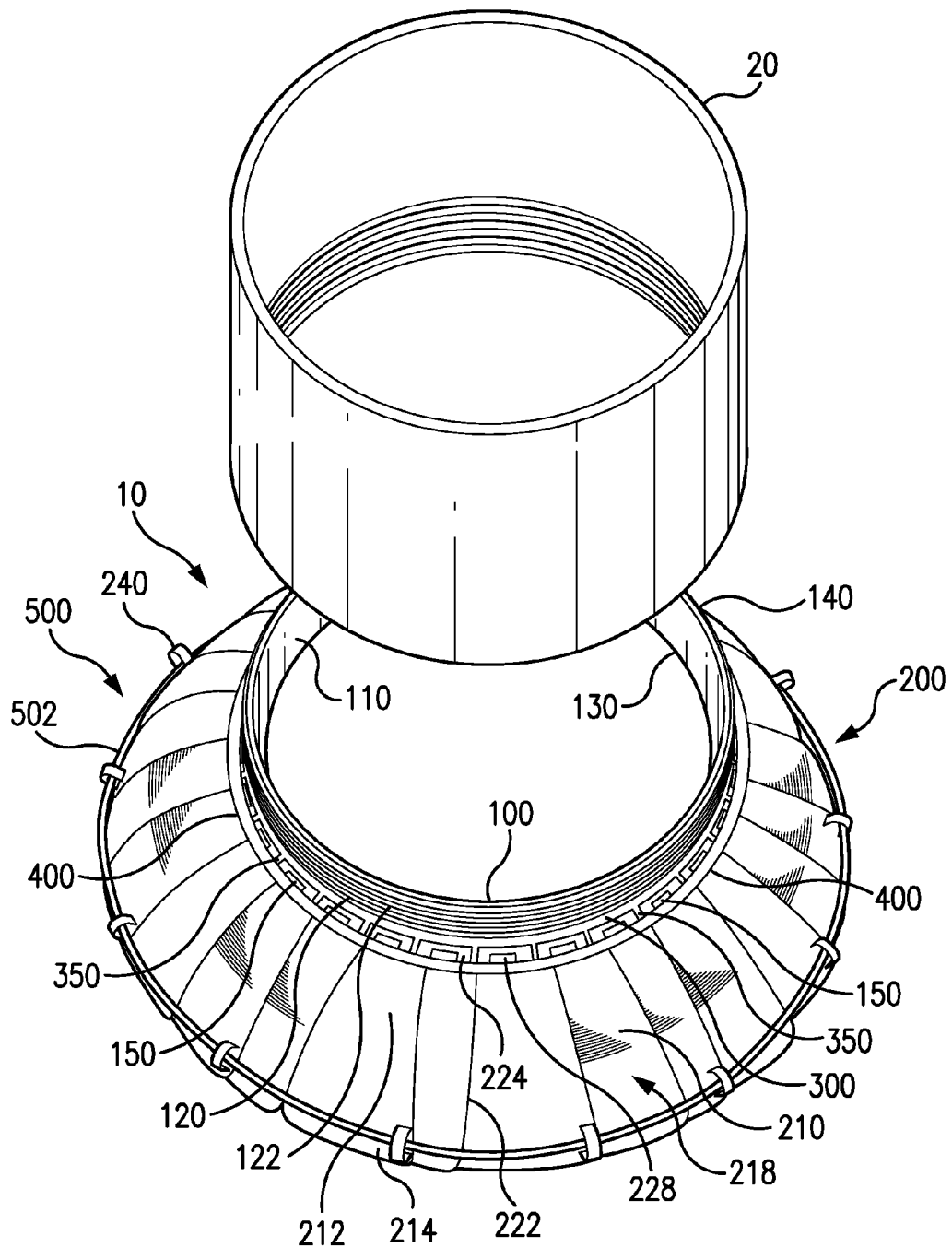
FIG. 3 is a perspective view of a portion of the preferred embodiment partially illustrated in FIG. 1.

Referring generally to FIG. 3, a fixed-diameter securement assembly is configured to secure pipe 20 of known diameter and, as constructed and arranged in this specific embodiment, threadably engages the pipe 20 to provide a secure fit.

Referring in more detail to FIGS. 1 and 2, the variable-diameter securement assembly of the universal pipe coupler 10 includes a central support ring 100 pivotally mounting a circular blade array 200 of overlapping, interleaved, fan-shaped blades 210. The central support ring 100 has a diameter $D_{ring}$. As shown, the blades 210 are arranged in the open position, extending radially outwardly away from the support ring 100. In FIG. 2, the blades 210 are shown in transition between the open position and the closed position.

The blades 210 are thus configured to pivot upward and inward toward the second pipe 30. As the blades 210 reach the closed position, they are in secure engagement with the outer surface of the second pipe 30 (as shown in FIG. 5). The location of the closed position varies according to the diameter of the second pipe 20, and thereby provides that the coupler 10 is constructed and arranged to secure joinder of a variety of diameters of the second pipe 20. As thus configured, it is anticipated that the variable-diameter securement assembly can accommodate pipes of diameters ranging from $0.5\, D_{ring}$ to $2.0\, D_{ring}$.

Referring in more detail to FIGS. 1 through 3, the central support ring 100 is further provided with an inner surface 110, an outer surface 120, a top end 130 and a bottom end 140. Blade support tabs 150 extend from the outer surface 120 of the central support ring 100 through blade support tab receiving apertures 228 provided on the blades 210 (as shown in FIGS. 3, 6, 7 and 8). The tabs 150 engage a tab support and blade retaining ring 400 (as shown in FIGS. 2, 3, 4 and 5).

Male pipe threads 122 are provided on the outer surface 120 of the support ring 100, and extend from the bottom 140 of the support ring 100, up toward the top 130 of the support ring 100, stopping before they reach the blade support tabs 150. The male pipe threads 122 are configured to threadably engage threads (not shown) on the inside of the first pipe 20, to connect the universal pipe coupler 10 to a first pipe 20 while the rest of the apparatus is used to connect to the second pipe 30. As shown, the male pipe threads are also configured to threadably engage a blade lateral motion restricting tab support ring 300.

Referring in more detail to FIGS. 1 and 2, the blades 210 of the blade array 200 are pivotally mounted on blade support tabs 150 of the central support ring 100. As shown more clearly in FIGS. 6 and 7, each blade 210 is generally fan shaped, having a proximal end 212 oriented inwardly toward the central support ring 100 and a distal end 214 positioned away from the central support ring 100. Each blade 210 further has an inner face 216 and an outer face 218 (see FIG. 2). Each blade 210 further has a leading edge 220, a trailing edge 222, and a blade mounting extension 224 extending from the proximal end 212 of the blade 210. The proximal end 212 of the blade 210 further has two shoulders 226 adjacent and on either side of the blade mounting extension 224. A blade support tab receiving aperture 228 extends through the blade mounting extension 224.

Each blade distal end 214 is wider than the proximal end 212. Preferably, the blade mounting extension 224 is curved away from the blade inner 216 surface and toward the blade outer surface 218, thereby facilitating pivoting of the blade 210 on the central support ring blade support tab 150. Each blade 210 is slightly curved along its length, such that the leading edge 220 and the training edge 222 are slightly closer to each other along the inner face 216 of the blade 210.

Referring now in detail to FIGS. 6 through 10, each blade 210 is mounted on a blade support tab 150 extending radially from the central support ring 100. The blade support tab 150 extends through the blade support tab receiving aperture 228 pivotally engaging the blade 210 is attached to the tab support and blade retaining ring 400. Tab support and blade retaining ring 400 encircles the blade array 200. The tab support and blade retaining ring 400 is positioned to limit the pivot range of blades 210 as desired. Blade support tabs 150 are positioned to engage the tab support and blade retaining ring 400 and are thus constructed and arranged to maintain the blades 210 in secured relation with the blade support tabs 150.

The curved inner face 216 of the blade 210 is oriented toward the central support ring 100, the distal end 214 of the blade 210 is oriented away from the central support ring and upward from the top 130 of the central support ring 100. The distal end of the blade mounting extension 224 curves away from the central support ring 100 away the bottom 140 of the central support ring 100.

The blade support tab receiving aperture 228 is sized to receive support tab 150, thereby permitting the blade 210 to pivot upward toward the top 130 of the central support ring 100 or pivotally recline away from the top 130 of the central support ring 100, so that when the blade array 200 is reclined, the blade array 200 approximates the dimensions of a flat disk.

A blade lateral motion restricting tab support ring 300 is threadably mounted on the central support ring 100 below the blade support tabs. The blade lateral motion restricting tab support ring 300 has radially extending, equally spaced blade lateral motion restricting tabs 350. The blade lateral motion restricting tab support ring 300 has the same number of blade lateral motion restricting tabs 350 as the central support ring has blade support tabs 150. When the blade lateral motion restricting tab support ring 300 is threadably engaged on the central support ring 100, the blade lateral motion restricting tabs 350 are aligned with center of the spaces between the blade support tabs 150. Each blade lateral motion restricting tab 350 extending from the blade lateral motion restricting tab support ring 300 extends out to and is also attached to the tab support and blade retaining ring 400.

The blade lateral motion restricting tabs 350 extend beneath the shoulders 226 of the blades 210 and prevent the blades from rotating around the blade support tabs, but do not limit the pivoting motion of the blades both toward and away from the central support ring 100. The blade lateral motion restricting tab 350 extends radially from the blade lateral motion restricting tab support ring 300 and passes under a first blade's blade shoulder. The same blade lateral motion restricting tab 350 also passes under the adjacent blade's blade shoulder 226, where the blade lateral motion restricting tab 350 prevents the blade shoulders 226 from dipping out of alignment and letting the blades 210 move laterally, keeping the blades 210 properly overlapped, and interleaved.

To further provide the variable-diameter securement assembly 500, the blades 210 mount a draw cable receiving ring 240 located on the outside of the distal ends of some of the blade 210. A draw cable 502 has a length L and two ends. The cable 502 is positioned so that the draw cable 502 is threaded through each of the receiving rings 240 and so that the draw cable 502 encircles the blade array 200. The draw cable 502 has a variable engagement or working length $L_{engage}$ representing the portion of the draw cable 502 positioned to effect movement of the blades 210. In the preferred embodiment, this is accomplished by positioning the cable 500 through the receiving rings 240 such that the cable 502 passes through only one of the cable receiving rings 240 twice. As the two ends of the cable 502 are pulled away from one another, the engagement length $L_{engage}$ of the draw cable 502 decreases reducing the effective diameter D of the blade array 200, and the blades 210 extend upward and inward relative to the central axis of the support ring 100.

As shown in FIG. 4, the coupler 10 is positioned for engagement of a second pipe 30 which has a diameter smaller than that of the central support ring 100. The draw cable 502 has been pulled tight enough for the blade array 200 to engage the second pipe 30. Thus, it can be seen that the blade array 200 is movable from a first, open position to a second, closed position.

As shown in FIG. 5, the coupler 10 is positioned for engagement of a second pipe 30 which has a diameter larger than that of the central support ring 100. The draw cable 502 has only been pulled tight enough for the blade array 200 to engage the second pipe 30. Thus, it can be seen that the blade array 200 is movable from a first, open position to a second, closed position, and further that the location of the second, closed position depends on the diameter of the second pipe 30 to be engaged.

The adaptability of the apparatus is thus apparent. As needed, by drawing the cable more tightly, the blades fold in to an effective radius smaller than that of the ring to which they are mounted. They overlap one another, thereby securing a tight fit to a pipe or conduit (not shown).

Referring now to FIG. 3, a fixed diameter securement assembly is provided. As shown, the coupler 10 is positioned to be threadably connected to the first pipe 20. The blade array 200 is viewed seen from the outside of the array 200. The blade lateral motion restricting tab support ring 300, blade lateral motion restricting tabs 350, the blade support tabs 150 along with tab support and blade retaining ring 400 are also visible.

Cycle of Operation

Typically when the universal pipe coupling is used to repair a leaking underground line, a hole is excavated in the area of the leak. The leaking line is exposed and when using a universal pipe coupler 10, as the preferred embodiment and described in detail above, the free end of the first pipe 20 is internally threaded. The universal pipe coupler 10 is threadably engaged to the internal threads of the first pipe 20, possibly using pipe dope to ensure a liquid and gas tight seal between the universal pipe coupler 10 and the first pipe 20.

A generous amount of sealing epoxy is then applied to the inner faces 216 of the blade array 200 and to the spaces between top end of the central support ring 100 and blade support tabs and the blade array 200. A generous amount of sealing epoxy is also applied to the end of the second pipe 30 and the two ends of the draw cable 502 are pulled, shortening the draw cable 502 engagement length $L_{engage}$ drawing the blade array 210 into full contact with the second pipe 30, sealing the joint between the universal pipe coupler 10 and the second pipe 30. Additional sealing epoxy may be applied to the exterior of the coupler to ensure a liquid or gas tight seal between the pipes 20 and 30, and the universal coupler 10. A reinforcing backing material may also be applied to the outside of the sealing epoxy to reinforce the connections. Once the epoxy has set sufficiently, the hole in the ground may be backfilled and the previously leaking pipe line or conduit may be returned to service.

Thus, the universal pipe coupler 100 is constructed with a somewhat collapsible, blade assembly and is arranged so that a single size coupler can be used to join two lengths of pipe or pipe fitting to one another without custom fitting in the field. This coupler 100, which can be used as a coupler, will be used to provide a non-leaking connection or in place of a union between two pieces of pipe or two sections of conduit. In a preferred embodiment, the coupler can be used to connect and join two sections of pipe that have either the same or dissimilar outside diameters. Additionally, the pipe or conduit materials to be coupled or joined together can be of dissimilar host materials.

Previously, couplers had to be matched to the pipe size and material of the pipes to be joined. The disclosure herein eliminates the need for multiple couplers, as one size would fit many types of materials and many different outside diameters. Moreover, the coupler is expected to be sufficiently rigid and strong so as to meet or exceed current ASTM standards for couplers designed for underground applications and/or pressure pipelines.

In addition to the physical characteristics set forth in the attached drawings, a hydrophilic band or o-ring and/or a combination of a high grade sealing epoxy may be used on the interior and exterior of the coupler 100 where the coupler 100 meets the second pipe to ensure that an air tight and fluid tight connection has been made. This will provide a leak free connection for either gravity fed pipelines as well as pressure pipelines.

As thus described, a central support ring 100 is provided having outwardly blade support tabs 150. A series of interlayered, fan-shaped blades 210 are provided, each having at least one blade support tab receiving aperture 228 so as to be received by the blade support tabs 150 of the central support ring 100 and maintained in a pivotal relationship with the ring 100. As shown in FIG. 1, the blades 210 are positioned in an open, rearward position.

The blades 210 are movable from an open, rearward position toward a forward, closing position. A drawing cable 502 is shown, to be positioned to effect movement of the blades from the open position to the closed position.

Draw cable receiving rings 240 are positioned on the rear 218, distal end 214 of each blade 210. Each ring is constructed and arranged to receive the drawing cable 502 therethrough. The drawing cable is then inserted into each draw cable receiving rings 240 so as to circumscribe the blades 210. By pulling the cable 502 tight, the effective radius of the blade array 200 is reduced, and the blades 210 are drawn upward and inward relative to the axis of the central support ring 100.

In the illustrated embodiment, a male-threaded surface is shown (FIG. 3). This can be provided to thread into one of the pipes to be connected. Thus, where two pipes 20 and 30 are to be joined, one need not furnish an adapter having a specific, first end diameter and another, specific second end diameter. Another advantage achieved by the foregoing disclosure is that in-ground repair can be effected without digging a large hole at the site to be repaired. Specifically, where two pipes 20 and 30 were to be joined, one typically digs a hole of sufficient size to be able to bring a lengthy adapter coupler into the hole and position it over both pipes 20 and 30. The hole may even have to be big enough so that a person can climb down and do the positioning while in the hole.

The instant disclosure provides a mechanism to dig a smaller hole than is would otherwise be necessary. The hole need only be big enough to receive a relatively flat coupler 10. The coupler 10 need not be placed precisely over each pipe, as it can be manipulated via the draw cable to clamp down on the second pipe 30.

Another feature of the instant disclosure may not be apparent without explanation. The interlocking blade array 200 need only to be fitted onto one of the two pipes 20 and 30 to be joined. However, one can adapt the same features to both ends 130 and 140 of the central support ring 100, thereby providing a double-sided coupler that can be adapted more easily to pipes, particularly of different diameters.

Thus, a universal pipe coupler is disclosed. The pipe coupler includes a variable diameter securement assembly having a support ring of diameter $D_{ring}$ having an outer periphery and being constructed and arranged to effect sealable securement to a first pipe having a diameter of between about 0.5 $D_{ring}$ and about 2.0 $D_{ring}$. A fixed diameter securement assembly is constructed and arranged to effect sealable securement to a second pipe.

The variable diameter securement assembly further has a plurality of blades arranged into a blade array surrounding the support ring, upon which each blade has a proximal end and a distal end. Each blade proximal end is pivotally attached to the outer periphery of the support ring, and each blade distal end extends radially away from the ring, the blade thereby being moveable between an open position and a closed position.

A flexible restraining member is provided and is moveable between an elongated position and a shortened position. The restraining member is thus positioned to slidably engage each blade.

Each blade is generally fan shaped and has an inner face, an outer face, a leading edge, and a trailing edge. Each blade's distal end is wider than its respective proximal end. When the blades are in the closed position, a portion of the inner face of each blade overlaps and is in communicative contact with a portion of the outer face of an adjacent blade.

Each blade further has a blade mounting extension extending from the proximal end of the blade and curving away from the blade inner face and toward the blade outer face. Each blade mounting extension has a blade support tab receiving aperture and is constructed and arranged to facilitate pivoting of the blade on a central support ring blade support tab.

The central support ring has an inner surface, an outer surface, a top end and a bottom end and has blade support tabs extending from the outer surface of the central support ring. Each blade support tab extends through a blade support tab receiving aperture and pivotally engages the blade on the central support ring.

The proximal end of the blade further has a pair of shoulders positioned adjacent and on either side of the blade mounting extension. A blade lateral motion restricting tab support ring is mounted on the central support ring in cooperative relation to the blade support tabs. The blade lateral motion restricting tab support ring has radially extending, equally spaced blade lateral motion restricting tabs aligned with the spaces between the blade support tabs.

When the restraining member is in the elongated position, the blades are movable to the open position and when the restraining member is in the shortened position the blades are confined to the closed position. When the blades are moved to the closed position, they are in position to effect sealable securement of the first pipe.

The described embodiments are to be considered in all respects only as illustrative and not restrictive, and the scope of the invention is, therefore, indicated by the appended claims rather than by the foregoing description. Those of skill in the art will recognize changes, substitutions and other modifications that will nonetheless come within the scope of the invention and range of the claims.

What is claimed is:

1. A universal pipe coupler comprising:
a primary, variable diameter securement assembly having a support ring of diameter $D_{ring}$ having an outer periphery and being constructed and arranged to effect sealable securement to a first pipe having a diameter of between about 0.5 $D_{ring}$ and about 2.0 $D_{ring}$;
a secondary securement assembly constructed and arranged to effect sealable securement to a second pipe;
the primary, variable diameter securement assembly further comprising a plurality of blades arranged into a blade array completely surrounding the outer periphery, each blade having a proximal end and a distal end;
each blade proximal end pivotally communicating with the outer periphery of the support ring; and
each blade distal end extending radially away from the ring, the blade thereby being moveable between an open position and a closed position;
whereby when the blades are moved to the closed position, they are in position to effect sealable securement of the first pipe and whereby the universal pipe coupler effects sealable fluid communication between the first pipe and the second pipe.

2. The universal pipe coupler of claim 1, wherein the secondary securement assembly has a fixed diameter.

3. The universal pipe coupler of claim 2, wherein the second pipe has a diameter about equal to $D_{ring}$.

4. The universal pipe coupler of claim 1, further having a flexible restraining member moveable between an elongated position and a shortened position, the restraining member being positioned to slidably engage each blade;
whereby when the restraining member is in the elongated position, the blades are movable to the open position, and when the restraining member is in the shortened position, the blades are confined to the closed position.

5. A universal pipe coupler comprising:
a variable diameter securement assembly having a support ring of diameter Dring having an outer periphery and being constructed and arranged to effect sealable securement to a first pipe having a diameter of between about 0.5 $D_{ring}$ and about 2.0 $D_{ring}$; and
a fixed diameter securement assembly constructed and arranged to effect sealable securement to a second pipe;
the variable diameter securement assembly further comprising a plurality of blades arranged into a blade array surrounding the support ring, each blade having a proximal end and a distal end;
each blade proximal end being: pivotally attached to the outer periphery of the support ring;
each blade distal end extending radially away from the ring, the blade thereby being moveable between an open position and a closed position;
each blade further being generally fan shaped and having an inner face, an outer face, a leading edge, and a trailing edge, each blade having its distal end being wider than its proximal end; whereby when the blades are in the closed position, a portion of the inner face of each blade overlaps and is in communicative contact with a portion of the outer face of an adjacent blade;
a flexible restraining member moveable between an elongated position and a shortened position, the restraining member being positioned to slidably engage each blade;
whereby when the restraining member is in the elongated position, the blades are movable to the open position and when the restraining member is in the shortened position the blades are confined to the closed position;
whereby when the blades are moved to the closed position, they are in position to effect sealable securement of the first pipe.

6. The universal pip coupler of claim 5, further comprising:
each blade further having a blade mounting extension extending from the proximal end of the blade and curved away from the blade inner face and toward the blade outer face, the blade mounting extension being provided with a blade support tab receiving aperture and being constructed and arranged to facilitate pivoting of the blade on a central support ring blade support tab; and
the central support ring having an inner surface, an outer surface, a top end and a bottom end and having blade support tabs extending from the outer surface of the central support ring;
each blade support tab extending through a blade support tab receiving aperture and pivotally engaging the blade on the central support ring.

7. The universal pipe coupler of claim 6, further comprising:
the proximal end of the blade further having a pair of shoulders positioned adjacent and on either side of the blade mounting extension;
a blade lateral motion restricting tab support ring mounted on the central support ring in cooperative relation to the blade support tabs; the blade lateral motion restricting tab support ring having radially extending, equally spaced blade lateral motion restricting tabs aligned with the spaces between the blade support tabs;
the blade lateral motion restricting tabs extending beneath the blade shoulders and positioned to restrict the blades from rotating around the blade support tabs.

8. A universal pipe coupler comprising:
a variable diameter securement assembly having a support ring of diameter $D_{ring}$ having an outer periphery and being constructed and arranged to effect sealable securement to a first pipe having a diameter of between about 0.5 $D_{ring}$ and about 2.0 $D_{ring}$; and
a fixed diameter securement assembly constructed and arranged to effect sealable securement to a second pipe;
the variable diameter securement assembly further comprising a plurality of blades arranged into a blade array surrounding the support ring, each blade having a proximal end and a distal end;
each blade proximal end being pivotally attached to the outer periphery of the support ring;
each blade distal end extending radially away from the ring, the blade thereby being moveable between an open position and a closed position;
a flexible restraining member moveable between an elongated position and a shortened position, the restraining member being positioned to slidably engage each blade;
each blade further being generally fan shaped and having an inner face, an outer face, a leading edge, and a trailing edge, each blade having its distal end being wider than its proximal end; whereby when the blades are in the closed position, a portion of the inner face of each blade overlaps and is in communicative contact with a portion of the outer face of an adjacent blade;
each blade further having a blade mounting extension extending from the proximal end of the blade and curved away from the blade inner face and toward the blade outer face, the blade mounting extension being provided with a blade support tab receiving aperture and being constructed and arranged to facilitate pivoting of the blade on a central support ring blade support tab; and the central support ring having an inner surface, an outer surface, a top end and a bottom end and having blade support tabs extending from the outer surface of the central support ring;

each blade support tab extending through a blade support tab receiving aperture and pivotally engaging the blade on the central support ring;

the proximal end of the blade further having a pair of shoulders positioned adjacent and on either side of the blade mounting extension; and a blade lateral motion restricting tab support ring mounted on the central support ring in cooperative relation to the blade support tabs; the blade lateral motion restricting, tab support ring having radially extending, equally spaced blade lateral motion restricting tabs aligned with the spaces between the blade support tabs;

whereby when the restraining member is in the elongated position, the blades are movable to the open position and when the restraining member is in the shortened position the blades are confined to the closed position;

whereby when the blades are moved to the closed position, they are in position to effect sealable securement of the first pipe.

* * * * *